(12) United States Patent
Bruschewski et al.

(10) Patent No.: US 9,180,560 B2
(45) Date of Patent: Nov. 10, 2015

(54) METHOD FOR SELECTING A GEOMETRY OF A BLADE

(71) Applicant: Rolls-Royce Deutschland Ltd & Co KG, Blankenfelde-Mahlow (DE)

(72) Inventors: Martin Bruschewski, Langen (DE); Christoph Hubig, Berlin (DE); Carsten Loof, Oberursel (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 538 days.

(21) Appl. No.: 13/708,731

(22) Filed: Dec. 7, 2012

(65) Prior Publication Data

US 2013/0166056 A1    Jun. 27, 2013

(30) Foreign Application Priority Data

Dec. 8, 2011    (DE) .......................... 10 2011 120 682

(51) Int. Cl.
*G06F 17/00* (2006.01)
*B23P 15/00* (2006.01)
(Continued)

(52) U.S. Cl.
CPC ............... *B23P 15/006* (2013.01); *B23P 15/02* (2013.01); *B23P 15/04* (2013.01); *F01D 5/34* (2013.01);
(Continued)

(58) Field of Classification Search
CPC ......... G06F 17/00; F01D 21/003; F01D 5/34; B23P 15/006; B23P 15/02; B23P 15/04; F05D 2230/50; F05D 2230/60; F05D 2260/821; Y02T 50/673

USPC ........... 700/97, 98, 117, 118, 182; 703/1, 6, 7
See application file for complete search history.

(56) References Cited

U.S. PATENT DOCUMENTS 5,997,242 A * 12/1999 Hecker et al. .................... 415/72
6,338,610 B1 * 1/2002 Harada et al. ............. 416/186 R
(Continued)

FOREIGN PATENT DOCUMENTS

| EP | 2020638 | 2/2009 |
| WO | 2009/016210 | 2/2009 |
| WO | 2012/019584 | 2/2012 |

OTHER PUBLICATIONS

German Search Report dated Aug. 23, 2012 from counterpart application.
(Continued)

*Primary Examiner* — Charles Kasenge
(74) *Attorney, Agent, or Firm* — Timothy J. Klima; Shuttleworth & Ingersoll, PLC

(57) ABSTRACT

A method selects from a plurality of predetermined blade geometries, a blade geometry for a blade wheel for a turbomachine, with for the predetermined blade geometries at least one characteristic value identifying an aerodynamic property of the blade geometry and at least one characteristic value identifying a structural mechanism of the blade geometry being filed in a memory. An evaluation unit ascertains for each blade geometry a total value, which is calculated from the assigned characteristic values. The evaluation unit selects at least that blade geometry whose total value has an extreme value of all computed total values of the blade geometries. At least one characteristic value identifying producibility of the respective blade geometry is filed in the memory additionally to the blade geometries. The evaluation unit also incorporates while ascertaining the total value of the respective blade geometry the characteristic value identifying producibility.

11 Claims, 5 Drawing Sheets

Figure 1:
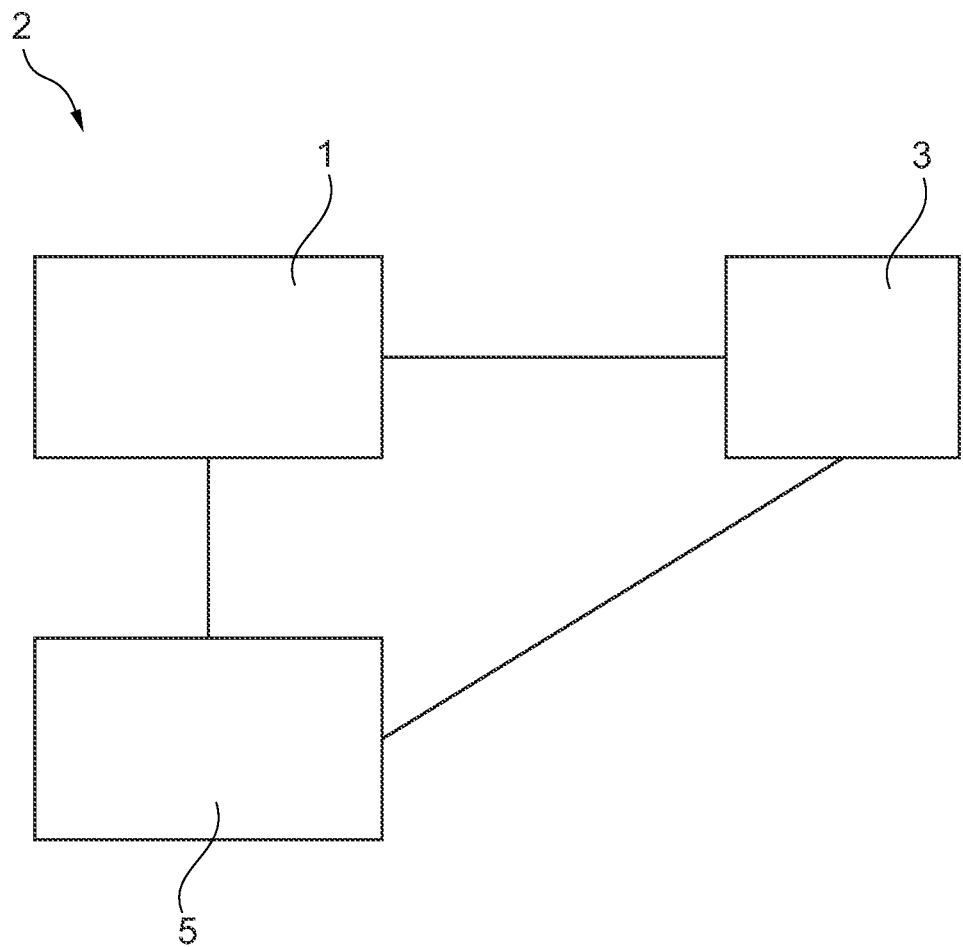

(51) Int. Cl.
  *B23P 15/04* (2006.01)
  *B23P 15/02* (2006.01)
  *F01D 5/34* (2006.01)
  *F01D 21/00* (2006.01)

(52) U.S. Cl.
  CPC .............. *F01D 21/003* (2013.01); *G06F 17/00* (2013.01); *F05D 2230/50* (2013.01); *F05D 2230/60* (2013.01); *F05D 2260/821* (2013.01); *Y02T 50/673* (2013.01)

(56) References Cited

U.S. PATENT DOCUMENTS

| | | | |
|---|---|---|---|
| 7,578,655 B1* | 8/2009 | Matheny | 416/95 |
| 7,581,930 B2* | 9/2009 | Aggarwala et al. | 416/193 A |
| 8,075,260 B2* | 12/2011 | Aki et al. | 415/199.2 |
| 2007/0217909 A1* | 9/2007 | Aki et al. | 415/208.3 |
| 2008/0240924 A1* | 10/2008 | Kizuka et al. | 416/223 R |
| 2009/0012752 A1 | 1/2009 | Graning et al. | |
| 2009/0162204 A1* | 6/2009 | Aggarwala et al. | 416/204 R |
| 2010/0042244 A1 | 2/2010 | El-Wardany et al. | |
| 2012/0057982 A1* | 3/2012 | O'Hearn et al. | 416/223 A |

OTHER PUBLICATIONS

European Search Report dated Mar. 8, 2013 from counterpart application 12195473.9.

Rolf Domberger et al, "Multidisciplinary Optimization in Turbomachinery Design", European Congress on Computational Methods in Applied Sciences and Engineering (Sep. 14, 2000), Seiten 1-15, XP055055004.

Jureczko M et al, "Optimisation of Wind Turbine Blades", Journal of Materials Processing Technology, Elsevier, NL (Online) Bd. 167, Mr. 2-3 (Aug. 30, 2005), Seiten 463-471, SP027606427.

Anonymous, "High Performance Ti Machining", (Jan. 1, 2008), Seiten 1-60, XP055054998.

* cited by examiner

METHOD FOR SELECTING A GEOMETRY OF A BLADE

This invention relates to a method for selecting out of a plurality of predetermined blade geometries a blade geometry for a blade wheel to be manufactured from solid material for an engine in accordance with the type defined in greater detail herein.

Blade wheels are known from practice which are milled from solid material. To ensure that the respective blade wheel corresponds as closely as possible to the predetermined boundary conditions, methods are used by which the blade geometry best suited for the application is selected out of a plurality of blade geometries. To do so, all blade geometries are analysed with respect to their aerodynamic and structural-mechanical properties. To allow an objective selection, each blade geometry is assigned at least one characteristic value identifying aerodynamic properties of the respective blade geometry and at least one characteristic value identifying structural-mechanical properties of the respective blade geometry. By jointly considering a predetermined weighting of the individual characteristics with the respectively assigned characteristic value, a total value is ascertained for each blade geometry and the blade geometry having the highest total value is selected.

In a directly following process step, this blade geometry is checked in respect of its producibility, i.e. it is checked whether the blade geometry can be milled out of the solid material. If this is not the case, the blade geometry must be modified. A resultant alteration of the blade geometry may however have a detrimental effect on the aerodynamic and structural-mechanical properties. It might prove necessary for a design process of the blade geometry at this point in time to be restarted, so that very high development costs for the blade design and for development of a production strategy are incurred overall. This additional time expenditure can result in delays in production and sales of the blade wheels.

With this procedure, requirements in respect of the producibility of the blade wheels are not taken into account at all or only after the blade design proper, so that a milling strategy can only be optimized for a predetermined geometry.

The object underlying the present invention is therefore to provide a method for selecting out of a plurality of predetermined blade geometries a blade geometry for a blade wheel to be manufactured from solid material for an engine, by which method a blade geometry is selected which can be readily produced besides having good aerodynamic and structural-mechanical properties.

It is a particular object of the present invention to provide solution to the above problem by a method in accordance with the features described herein.

A method is proposed for selecting out of a plurality of predetermined blade geometries a blade geometry for a blade wheel to be manufactured from solid material for a turbomachine, where for the predetermined blade geometries at least one characteristic value identifying an aerodynamic property of the blade geometry and at least one characteristic value identifying a structural mechanism of the blade geometry are filed in a data memory, and a data evaluation unit ascertains for each blade geometry a total value, where the data evaluation unit selects at least that blade geometry whose total value has an extreme value of all computed total values of the blade geometries.

It is proposed in accordance with the invention that at least one characteristic value identifying producibility of the respective blade geometry is filed in the data memory additionally to the blade geometries, and the data evaluation unit also incorporates while ascertaining the total value of the respective blade geometry the characteristic value identifying producibility.

With the method in accordance with the invention for selecting a blade geometry, total costs made up of operating costs and production costs for blade wheels made from solid material can be significantly reduced. This is achieved in that the producibility of the respective blade geometry compared with known methods is considered together with aerodynamic and structural-mechanical properties and that blade geometry is selected which is optimized in respect of all of these properties. Accordingly, adjustments of the blade geometry, as are sometimes necessary with known selection processes, can be avoided at a later time and the required development time can be reduced. Compared with known selection processes, a blade geometry more suitable for production can be selected with the same aerodynamic and structural-mechanical properties, for example.

With the method in accordance with the invention, it is possible to compare geometries or designs equivalent in their aerodynamic and structural-mechanical properties in respect of their production properties, and hence also their production costs, at an early stage and to select the geometry less expensive overall. This results from the fact that the characteristic value identifying producibility is in inverse proportion to the production costs necessary for manufacturing the corresponding blade wheel. The total costs can for example be reduced in that, despite a possible increase of the operating costs of a blade wheel of this type due to minor changes in the blade geometry, production costs may be able to be reduced so much that the total costs are reduced overall.

A characteristic value identifying producibility of the blade geometry is in an advantageous embodiment of the method in accordance with the invention proportional to a maximum diameter of a generated surface of a rotationally symmetrical, in particular cylindrical or conical basic element, by means of which all surface points of the blade geometry in the area of the blades can be reached. A production expenditure for manufacturing a blade wheel made from solid material is directly correlated to a tool diameter used. The larger the corresponding maximum diameter, the larger the greatest possible diameter of the tool used. As the tool diameter increases, production expenditure and production costs decrease. Besides a cylindrical tool, conical or rotationally symmetrical shaping tools, for example milling tools, can also be used for manufacturing the blade wheel. The geometry of a tool of this type can be ascertained using the maximum diameter of the cylindrical element.

For automated implementation of the method, at least one data detecting unit can be provided which ascertains the respective characteristic values assigned to a blade geometry, with these characteristic values being filed in the data memory.

A further optimization of the blade geometry can be achieved in that the predetermined blade geometries are ascertained in an iterative process, in particular by a data evaluation unit.

In an advantageous embodiment of the method in accordance with the invention, it is provided that the total value assigned to the respective blade geometry is calculated from the assigned characteristic values and from a weighting assigned to the respective characteristic value and filed in the data memory.

The features stated herein are each suitable, singly or in any combination with one another, to develop the subject matter of the invention. The respective feature combinations do not represent any restriction with regard to the development of the subject matter in accordance with the invention, but have substantially only exemplary character.

Figure 2:
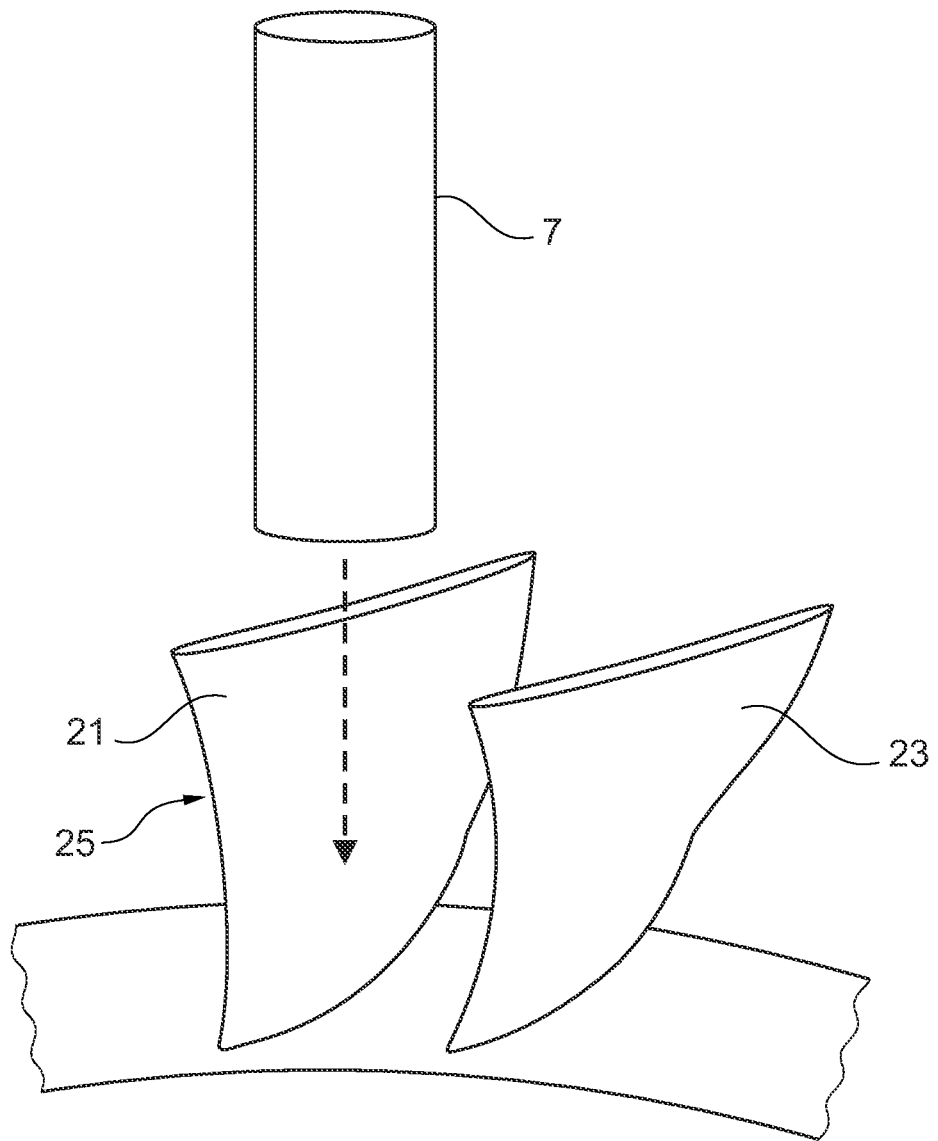
Figure 3:
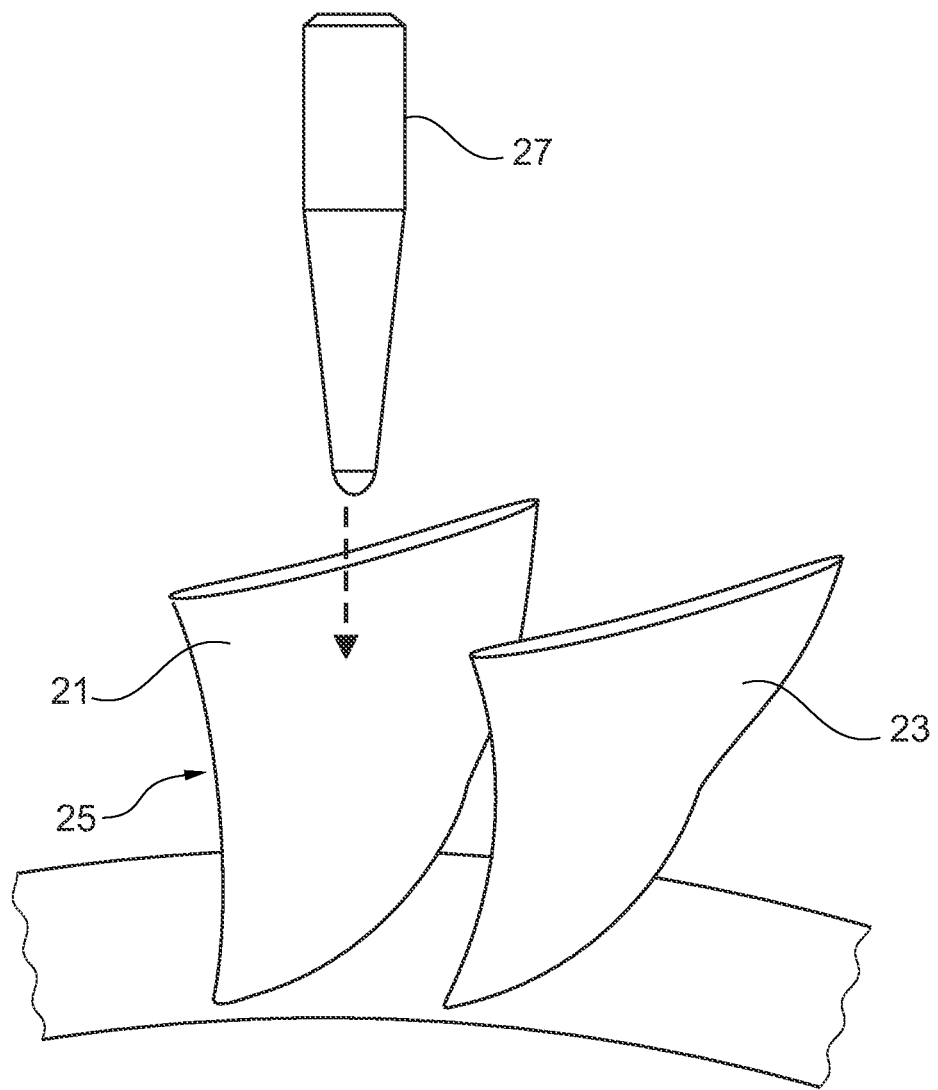
Figure 4:
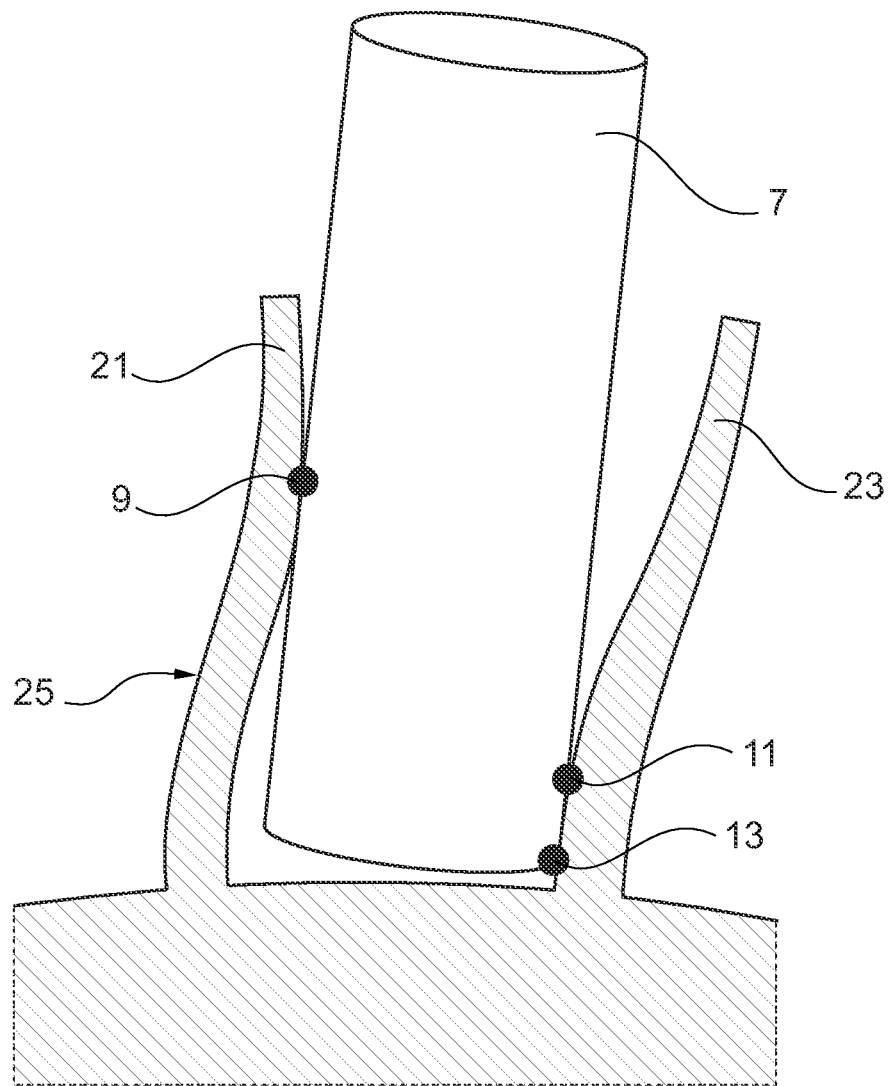
Figure 5:
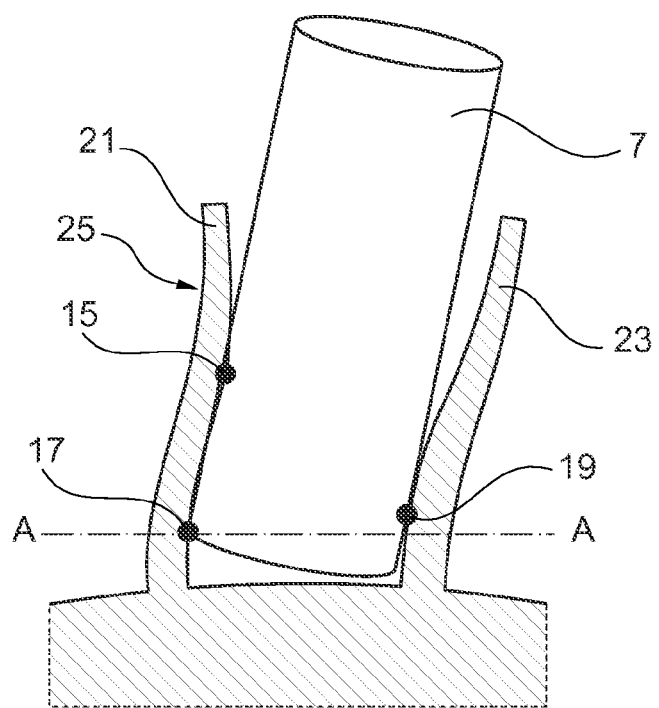
Figure 6:
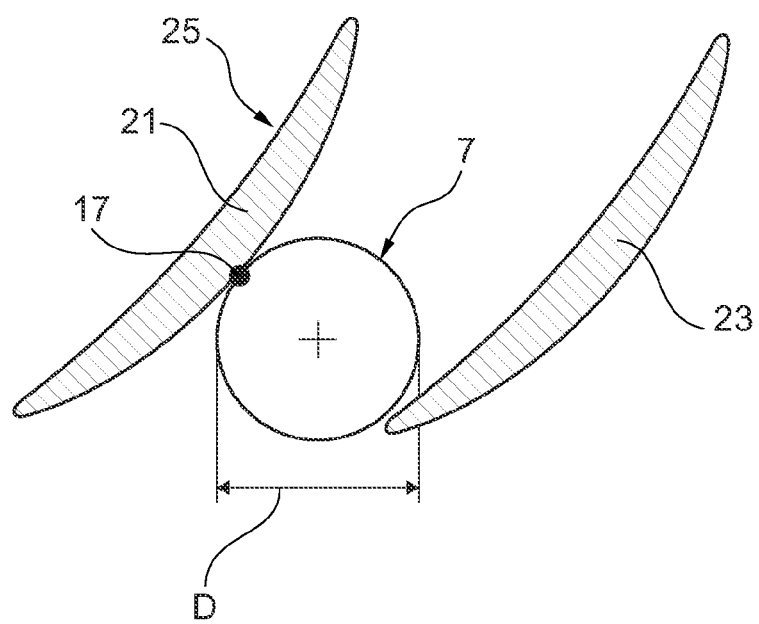

Further advantages and advantageous embodiments of the method in accordance with the invention will become apparent from present description with reference to the accompanying drawings. In the drawings, FIG. 1 shows a highly simplified representation of a device for the implementation of the method in accordance with the present invention, FIG. 2 shows a highly simplified three-dimensional representation of a section of a blade geometry with a cylindrical element provided for determining the producibility of the blade geometry, FIG. 3 shows a highly simplified three-dimensional representation of a section of a blade geometry corresponding to FIG. 2 with a milling tool, FIG. 4 shows a simplified sectional view through the blade geometry of FIG. 2 with the cylindrical element in three-dimensional representation, FIG. 5 shows a sectional view of the blade geometry corresponding to FIG. 4 with the cylindrical element shown in a different position, and FIG. 6 shows a sectional view along line A-A through the blade geometry of FIG. 5.

A method is described for selecting out of a plurality of predetermined blade geometries a blade geometry for a blade wheel to be manufactured from solid material for an engine of an aircraft, by which method a blade geometry can be selected that is optimized in respect of its aerodynamic properties, structural-mechanical properties and producibility. To do so, characteristic values are determined by a data detecting unit 1 of a device 2 shown in FIG. 1 for blade geometries developed in an iterative process, said values identifying aerodynamic properties, structural-mechanical properties and producibility of the respective blade geometry. One or more characteristic values can be ascertained here for each property.

These characteristic values are filed in a data memory 3 of the device 2. A weighting of the individual characteristic values relative to one another is also filed in the data memory 3.

A data evaluation unit 5 of the device 2 calculates here for each blade geometry a total value which in the present case results as the total of the respective characteristic value assigned to the blade geometry multiplied by the weighting filed in the data memory 3 and assigned to the respective characteristic value.

Then the data evaluation unit 5 selects here the blade geometry whose total value is the greatest. The selected blade geometry is optimized in respect of its aerodynamic properties, structural-mechanical properties and producibility on the basis of this method.

The characteristic value identifying the producibility of a blade geometry is ascertained as shown in FIGS. 2 to 6. The characteristic value corresponds to a maximum value of a diameter D of a generated surface of a cylindrical element 7, where all surface points 9, 11, 13 or 15, 17, 19, respectively, in the area of blades 21, 23 of a blade geometry 25 can be reached with the cylindrical element 7.

The maximum diameter D of the cylindrical element 7 is indirectly proportional to the production costs of the respective blade wheel. This results from the fact that a blade wheel having a selected blade geometry 25 can be manufactured using a milling device 27 having the maximum diameter D. Since a maximum infeed of a milling tool intended for manufacture of the blade wheel depends on the maximum diameter and substantially corresponds to it, the production costs fall as the diameter D of the milling tool rises. Accordingly, the production costs are lowest for the blade geometry 25 with the largest cylindrical element 7.

LIST OF REFERENCE NUMERALS

1 Data detecting unit
2 Device
3 Data memory
5 Data evaluation unit
7 Cylindrical element
9 to 19 Surface points
21, 23 Blades
25 Blade geometry
27 Milling device
D Diameter

What is claimed is:

1. A method for selecting one of a plurality of predetermined blade geometries for a blade wheel for a turbomachine and for manufacturing the blade wheel to the selected one of the plurality of predetermined blade geometries, comprising:
    filing in a data memory for the predetermined blade geometries at least one characteristic value identifying an aerodynamic property of the blade geometry and at least one characteristic value identifying a structural mechanism of the blade geometry;
    ascertaining with a data evaluation unit for each blade geometry a total value, which is calculated from the assigned characteristic values, with the data evaluation unit selecting a blade geometry having a total value which is an extreme value of all computed total values of the blade geometries;
    generating a characteristic value identifying producibility of each blade geometry, wherein the characteristic value identifying producibility is proportional to a maximum diameter of a generated surface of a rotationally symmetrical element, by which all surface points of the blade geometry in an area of the blades can be reached by the rotationally symmetrical element;
    filing in the data memory the characteristic value identifying producibility;
    using the data evaluation unit to incorporate the characteristic value identifying producibility while ascertaining the total value of the respective blade geometry;
    providing a solid material for manufacturing into the blade wheel;
    providing a rotational shaping tool having an operative portion to be positioned between adjacent blades of the blade wheel such that the operative portion has an operative portion maximum diameter approximately the maximum diameter but no greater than the maximum diameter;
    setting an infeed of the rotational shaping tool based on the operative portion maximum diameter;
    shaping the solid material with the rotational shaping tool to form the blade wheel.

2. The method of claim 1, wherein the characteristic value identifying producibility represents a maximum diameter of a generated surface of a cylindrical element, by which all surface points of the blades can be reached by the cylindrical element.

3. The method of claim 2, and further comprising providing at least one data detecting unit which ascertains the respective characteristic values assigned to a blade geometry, and filing the characteristic values in the data memory.

4. The method of claim 3, and further comprising ascertaining the predetermined blade geometries in an iterative process.

5. The method of claim 4, and further comprising calculating the total value assigned to the respective blade geometry from the assigned characteristic values and from a weighting assigned to the respective characteristic value and filed in the data memory.

6. The method of claim 5, and further comprising ascertaining the predetermined blade geometries in an iterative process with the data evaluation unit.

7. The method of claim 4, and further comprising ascertaining the predetermined blade geometries in an iterative process with the data evaluation unit.

8. The method of claim 1, and further comprising providing at least one data detecting unit which ascertains the respective characteristic values assigned to a blade geometry, and filing the characteristic values in the data memory.

9. The method of claim 1, and further comprising ascertaining the predetermined blade geometries in an iterative process.

10. The method of claim 1, and further comprising calculating the total value assigned to the respective blade geometry from the assigned characteristic values and from a weighting assigned to the respective characteristic value and filed in the data memory.

11. The method of claim 1, and further comprising ascertaining the predetermined blade geometries in an iterative process with the data evaluation unit.

* * * * *